United States Patent
Morikawa

[19]

[11] Patent Number: 5,956,287
[45] Date of Patent: Sep. 21, 1999

[54] SEMICONDUCTOR MEMORY

[75] Inventor: Kouichi Morikawa, Tokyo, Japan

[73] Assignee: Oki Electric Industry Co., Ltd., Tokyo, Japan

[21] Appl. No.: 08/959,857

[22] Filed: Oct. 29, 1997

[30] Foreign Application Priority Data

Nov. 1, 1996 [JP] Japan .................................. 8-291694

[51] Int. Cl.$^6$ .................................................. G11C 8/00
[52] U.S. Cl. ............................ 365/230.05; 365/189.05; 365/230.08
[58] Field of Search ....................... 365/230.05, 230.08, 365/189.05

[56] References Cited

U.S. PATENT DOCUMENTS 4,794,566 12/1988 Richards et al. ..................... 365/189
5,255,238 10/1993 Ichige et al. ........................ 365/220
5,339,268 8/1994 Machida ............................ 365/49
5,404,332 4/1995 Sato et al. .......................... 365/201

Primary Examiner—David Nelms
Assistant Examiner—Hien Nguyen
Attorney, Agent, or Firm—Jones & Volentine, L.L.P.

[57] ABSTRACT

The present invention provides a semiconductor memory capable of improving a write address generator which performs complained control by using many gates and capable of reducing layout area. A FIFO semiconductor memory having plural input ports is provided with a memory array MARRAY of m-word×n bit×2-having 1W1R cell, a write address generator WAG consisted of a shift register, a valid bit VB of m-word×2-bit having 1W1R cell, a write buffer WDBV for the valid bit, a valid bit sense amplifier SAV, a read control RCTL judging validness of read data and a read address generator having a circuit controlling update of read address.

10 Claims, 19 Drawing Sheets

| RVU | RVL | MBUSY | BUSY |
|---|---|---|---|
| * | * | 1 | 0 |
| 0 | * | 0 | 0 |
| * | 0 | 0 | 0 |
| 1 | 1 | 0 | 1 |

*=DON'T CARE

| RVU | RVL | MBUSY | USEL | LSEL |
|---|---|---|---|---|
| * | * | 1 | 0 | 1 |
| 0 | 1 | 0 | 0 | 1 |
| 1 | 0 | 0 | 1 | 0 |
| 1 | 1 | 0 | 1 | 0 |

*=DON'T CARE

FIG.7

SEMICONDUCTOR MEMORY

BACKGROUND OF THE INVENTION

1. Field of the Invention

The present invention relates to a semiconductor memory, more particularly, relates to a FIFO (First-In First-Out) semiconductor memory with plural input ports of a semiconductor integrated circuit.

2. Description of the Related Art

Conventionally, as this technique, DOI and YAMADA disclose "Method of fabricating 160 Gbit/s ATM (Asynchronous Transfer Mode) switch using a variable link speed switch" on 31–33 pages in SSE93-69 of Singaku Giho by Electronic Information Communication Society (Corporation).

As to a FIFO (First-In First-Out) memory with plural input ports, a structural sample is given of an 8W1R multi-port memory used as a buffer memory for an output buffer type ATM (Asynchronous Transfer Mode) switch.

FIG. 14 is a structural view showing a conventional FIFO memory with plural input ports. FIG. 15 is a structural view showing a memory core. FIG. 16 is a structural view showing a write address generator. FIG. 17 is a structural view showing a read address generator.

First, as shown in FIG. 14, the conventional FIFO memory having plural input ports is provided with input data signal multiplexers MUX 1, MUX 2, write request signal multiplexers MUX 3, MUX 4, a write address generator WAG, a memory core RAMCORE, a read address generator RAG, a timing generator TG, and a PLL circuit PLL.

As shown in FIG. 15, the memory core RAMCORE is provided with a memory array MARRAY (2W1R cell, m-word×n-bit), write buffers WDB0, WDB1, a sense amplifier SA, an output data latch OLA, write address latches WAL0, WAL1, a read address latch RAL, a write timing control WTC, and a read timing control RTC. The memory core RAMCORE constitutes 2W1R multi-port memory of m-word×n-bit.

The write address generator WAG, as shown in FIG. 16, is a logic circuit consisting of and provided with ANDs (AND circuits), an ORs (OR circuits), INVs (inverter circuits), DFFs (D type flip-flops) and SELs (selectors).

The read address generator RAG, as shown in FIG. 17, consists of a shift register in which the DFFs are serially connected.

An explanation is given of an operation of the 8W1R multi-port memory shown in FIG. 14 with reference to FIGS. 18 and 19.

The 8W1R multi-port memory functions to write data of n-bit into each of 8 or under ports simultaneously. As the memory core, a 2W1R multi-port memory of which buffer capacity is m is used. By four-multiplexing write data, the 8W1R multi-port memory is carried out. Further, the PLL produces high-speed clocks, thereby controlling internal timing.

Next, detailed explanations are given of the operation.

First, as shown in FIG. 18, in the write operation, n-bit input data signals WDI7, WDI5, WDI3, WDI1 are four-multiplexed by the MUX 1, n-bit input data signals WDI6, WDI4, WDI2, WDI0 are four-multiplexed by the MUX 2, write request signals WEI7, WEI5, WEI3, WEI1 are four-multiplexed by the MUX 3, and write request signals WEI6, WEI4, WEI2, WEI0 are four-multiplexed by the MUX 4. Four parallel signals of frequency f are time divisional multiplexed into one serial signal of frequency 4f.

The multiplexed n-bit input data signals WDI7, WDI5, WDI3, WDI1, the multiplexed n-bit input data signals WDI6, WDI4, WDI2, WDI0, the multiplexed write request signal WEI7, WEI5, WEI3, WEI1, and the multiplexed write request signals WEI6, WEI4, WEI2, WEI0 are inputted into WD1, WD0, WE1, WE0 in the memory core RAMCORE which is a 2W1R multi-port memory. Simultaneously, the write request signals WEI7, WEI5, WEI3, WEI1 and the write request signal WEI6, WEI4, WEI2, WEI2, WEI0 are inputted into the write address generator WAG.

Thereafter, the write address generator WAG generates write address, and the write address is inputted into WA1, WA0 of the memory core RAMCORE, thereby writing n-bit input data signals WDI7, WDI5, WDI3, WDI1 and n-bit input data signal WDI6, WDI4, WDI2, WDI0.

In the memory core RAMCORE shown in FIG. 15, by the write control clock WCLK and the write timing control WTC outputted from the timing generator TG, data and addresses are respectively outputted from the write buffers WDB0, WDB1 and the write address latches WAL0, WAL1 and are written in the 2W1R cell.

Further, as to write address generated by the write address generator WAG, it is necessary (1) that different addresses are inputted into the respective ports while writing (since a 2W1R multi-port memory is used as the memory core RAMCORE), (2) that an address is inputted into a port which requires to write, and (3) that, since three conditions for sequential access are required to carry out the FIFO function, when the number of write requests is 0 or when the number of shifts is 0 and the number of write requests is 1, a point shifting by +1 is address-inputted into the RAMCORE port which requests (hereinafter, called an internal port), and when the number of write requests is 2, a point shifting by +1 and a point shifting by +2 are respectively address-inputted into the internal port 0 and the internal port 1 simultaneously.

Explanations are given with reference to the timing chart in FIG. 18. In the first cycle of clock CLk, as to ports of the 8W1R multi-port (hereinafter, called an external port), write requests are given to eight ports of the external ports 7–0 simultaneously. As addresses inputted to the memory core RAMCORE, points shifting by +1, +2 are respectively inputted to the internal ports 1, 0 simultaneously.

In the second cycle of clock, write requests are given from four external ports 7, 4, 1, 0 simultaneously. For the external port 7, 8 shifting by +1 compared with the pre-shifted point (7 in WA1) is given to the WA1. For the external port 4, 9 shifting by +1 compared with the pre-shifted point (8 in WA1) is give to the WA0. For the external ports 0 and 1, 10 shifting by +1 compared with the pre-shifted point (9 in WA0) is given to the WA0 and 11 shifting by +2 is given to the WA0. Control of this write address is carried out by the write address generator shown in FIG. 16.

Successively, an explanation is given of read operation. As shown in FIG. 19, data written in the memory core RAMCORE is read by the read address generator consisting of a shift register.

In addition, timings of the write and read operations are controlled by internal high-speed clock $\phi_i$ (i:integer) generated by forming logic in the timing generator TG based on polyphase pulse outputted from the PLL circuit PLL. RST is a signal resetting address outputs from the write address generator WAG and the read address generator RAG.

However, in the above-described conventional structure, since a 2W1R multi-port memory is used for the conventional memory core as shown in FIG. 15, it is necessary to fabricate the write address generator WAG performing complicated control by using a lot of gates as shown in FIG. 16. Therefore, there is a problem that layout area increases.

SUMMARY OF THE INVENTION

It is an object of the present invention to solve the above problem, to improve a write address generator performing complicated control and to provide a semiconductor memory capable of reducing layout area.

The following is the present invention.

(1) A semiconductor memory comprises a memory cell array, a write address generator sequentially generating addresses to be written in the memory cell array, a validity register, a buffer writing a write request signal into the validity register, a read address generator generating a read address for the memory cell array, and a read controller judging validity of read data from the memory cell array in accordance with the write request signal read from the validity register.

(2) A memory array of m-word×n-bit×2 using 1W1R cell, a write address generator consisting of the shift register, a validity register of m-word×2-bit using 1W1R cell, a write buffer for the validity data, a sense amplifier for the valid bit, a read controller judging validity of read data, and a read address generator with a circuit controlling update of read address are provided, instead of the memory array of m-word×n-bit using 2W1R cell, the write address generator shifting address points in accordance with the number of write requests, and the read address generator consisting of a shift register in the conventional multi-port FIFO memory.

Thus, it is possible to simplify control of the write address and to slice about 77.4% of layout area in the write address generator out.

(3) Instead of the sense amplifier for reading each channel data and the selector for channel selection in the FIFO semiconductor memory described in (2), a column selector for each memory array and a sense amplifier for reading selected channel data are connected, and validity data and selected channel data are read by time sharing.

Thus, it is possible to reduce power consumption of the sense amplifier to ½.

(4) A memory array is divided into two, and a local word driver is provided in each memory array and receives the channel selection signal in the FIFO semiconductor memory described in (3).

Thus, it is possible to reduce the power consumption in the memory array to ½, compared with the above structure of (3).

BRIEF DESCRIPTION OF THE DRAWINGS

Other objects and advantages of the present invention will become apparent during the following discussion conjunction with the accompanying drawings, in which:

FIG. 7 is a view illustrating truth values of a read controller of a FIFO memory with plural input ports of the first embodiment according to the present invention;

DETAILED DESCRIPTION OF THE PREFERRED EMBODIMENTS

Preferred aspects and embodiments of the present invention will now be described with reference to the accompanying drawings.

Figure 1:
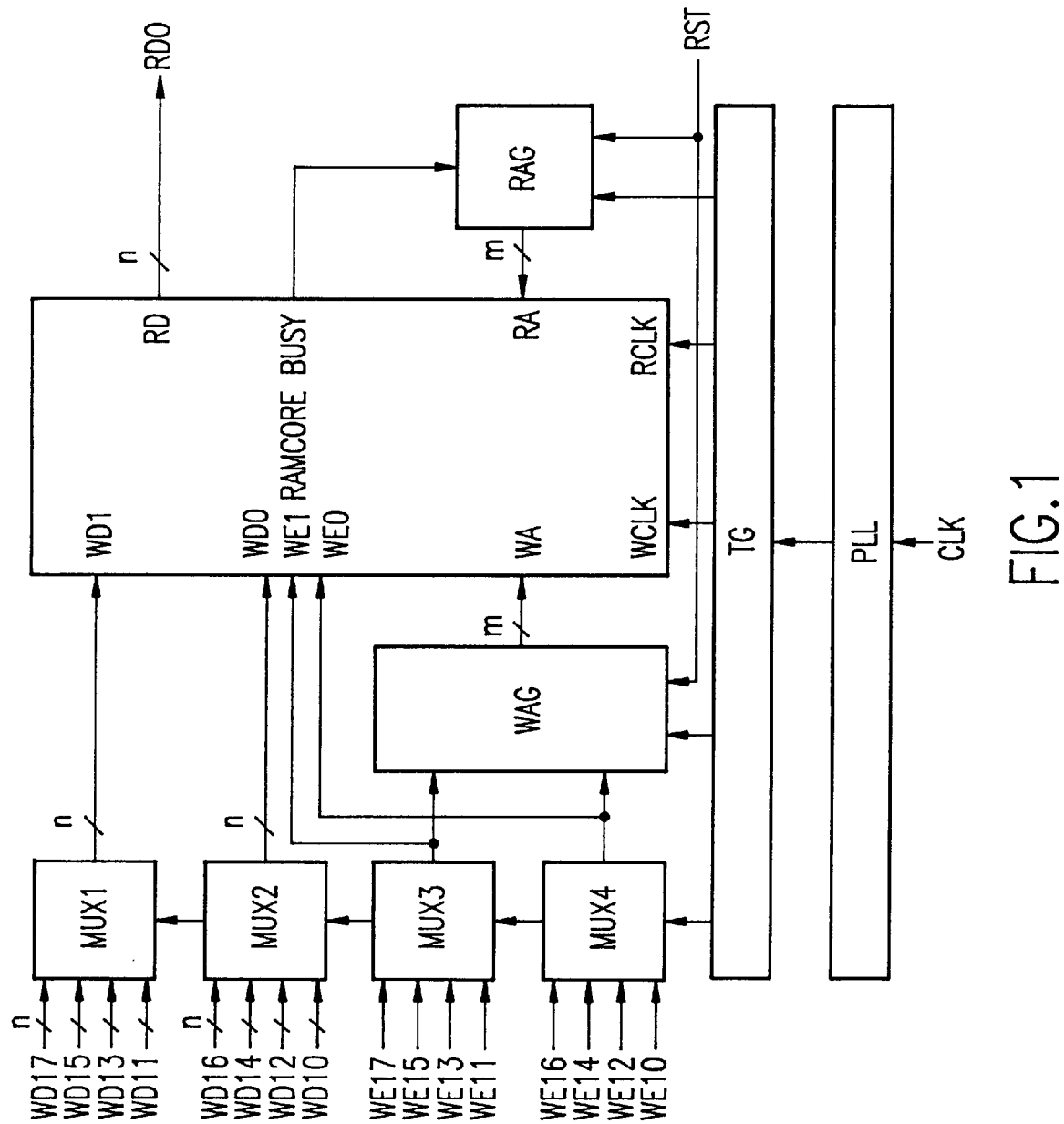
FIG. 1 is a structural view illustrating a FIFO memory with plural input ports of the first embodiment according to the present invention.
Figure 2:
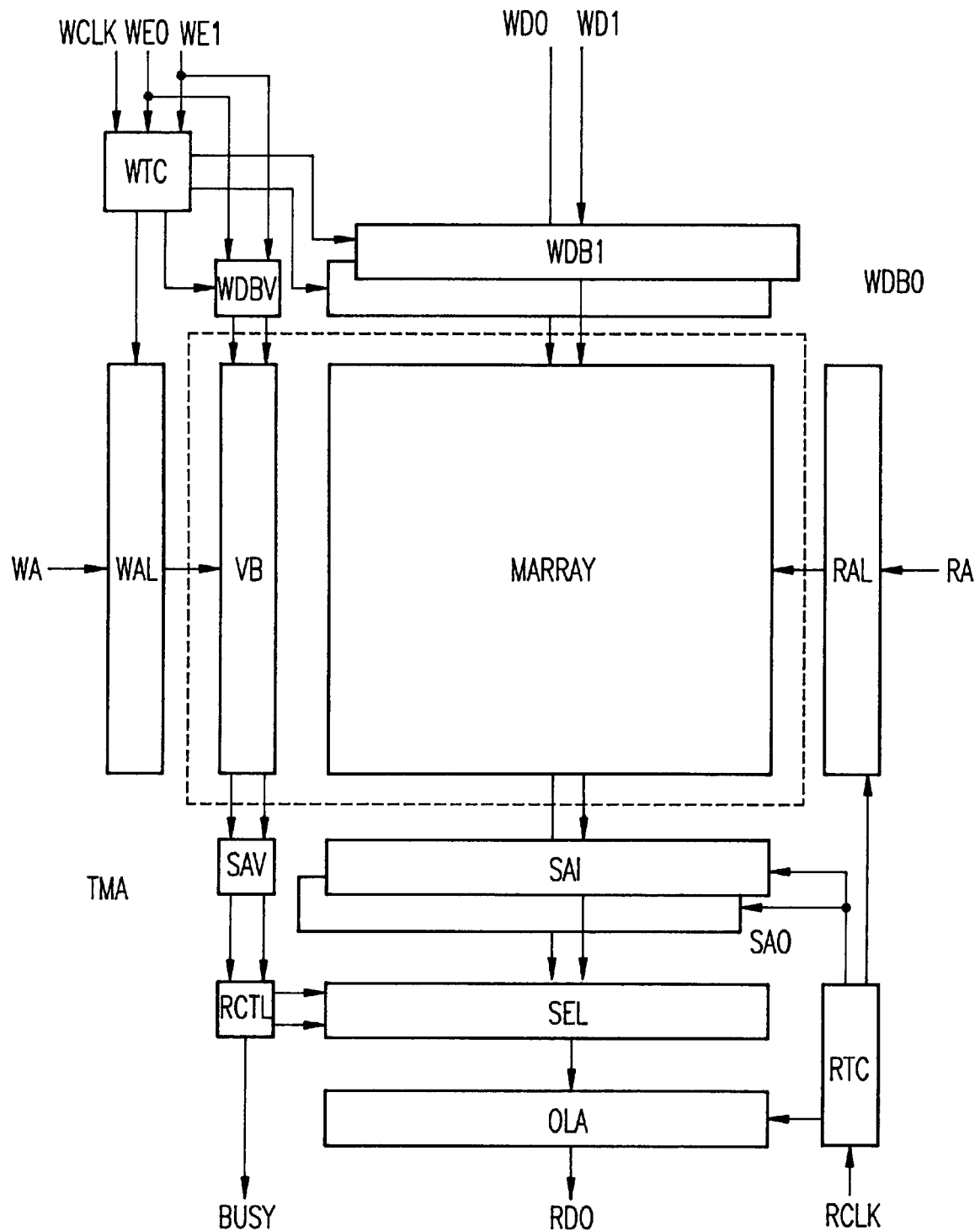
FIG. 2 is a structural view illustrating a memory core of a FIFO memory with plural input ports of the first embodiment according to the present invention.
Figure 3:
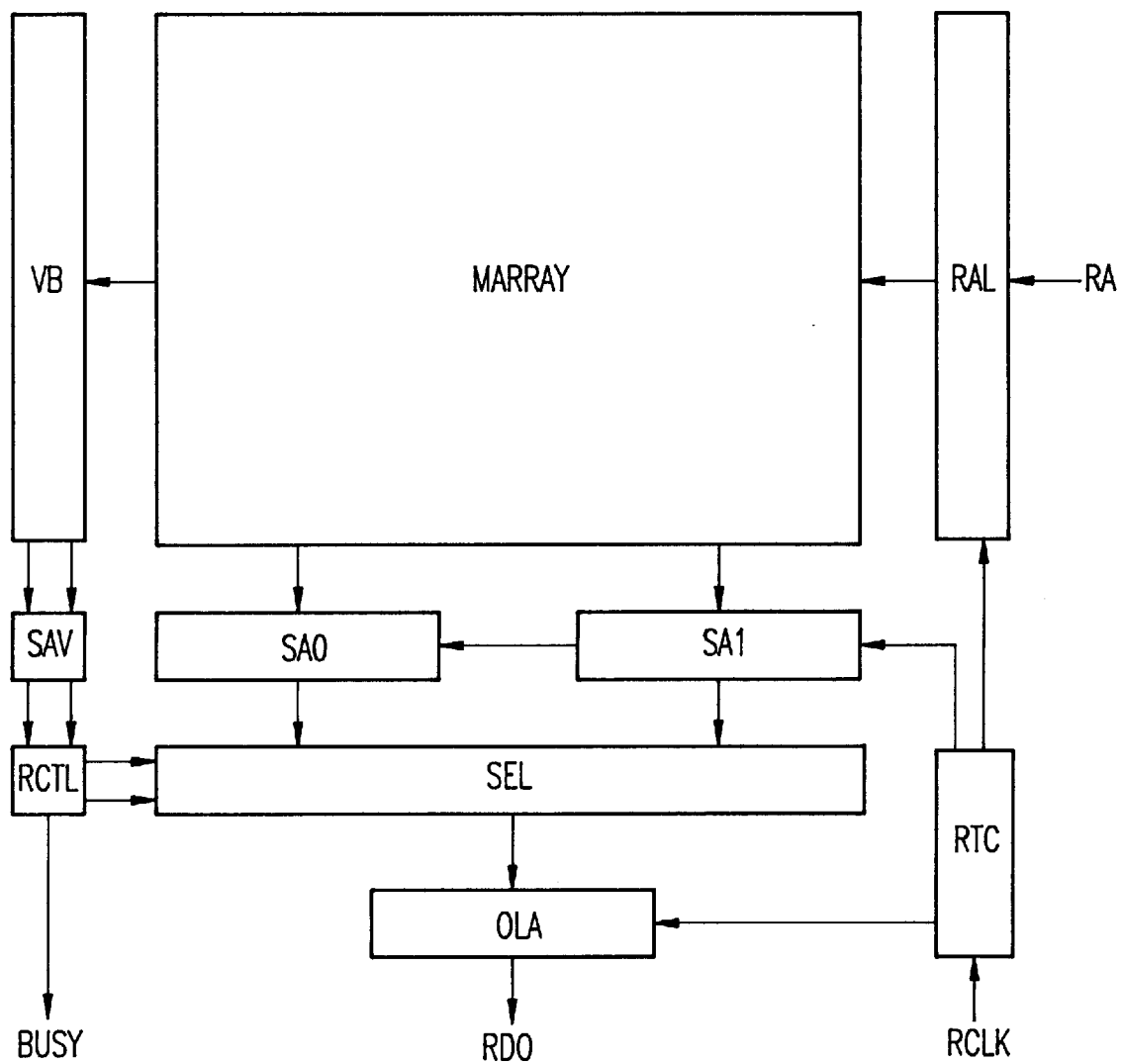
FIG. 3 is a structural view illustrating a read side of a memory core of a FIFO memory with plural input ports of the first embodiment according to the present invention.
Figure 4:
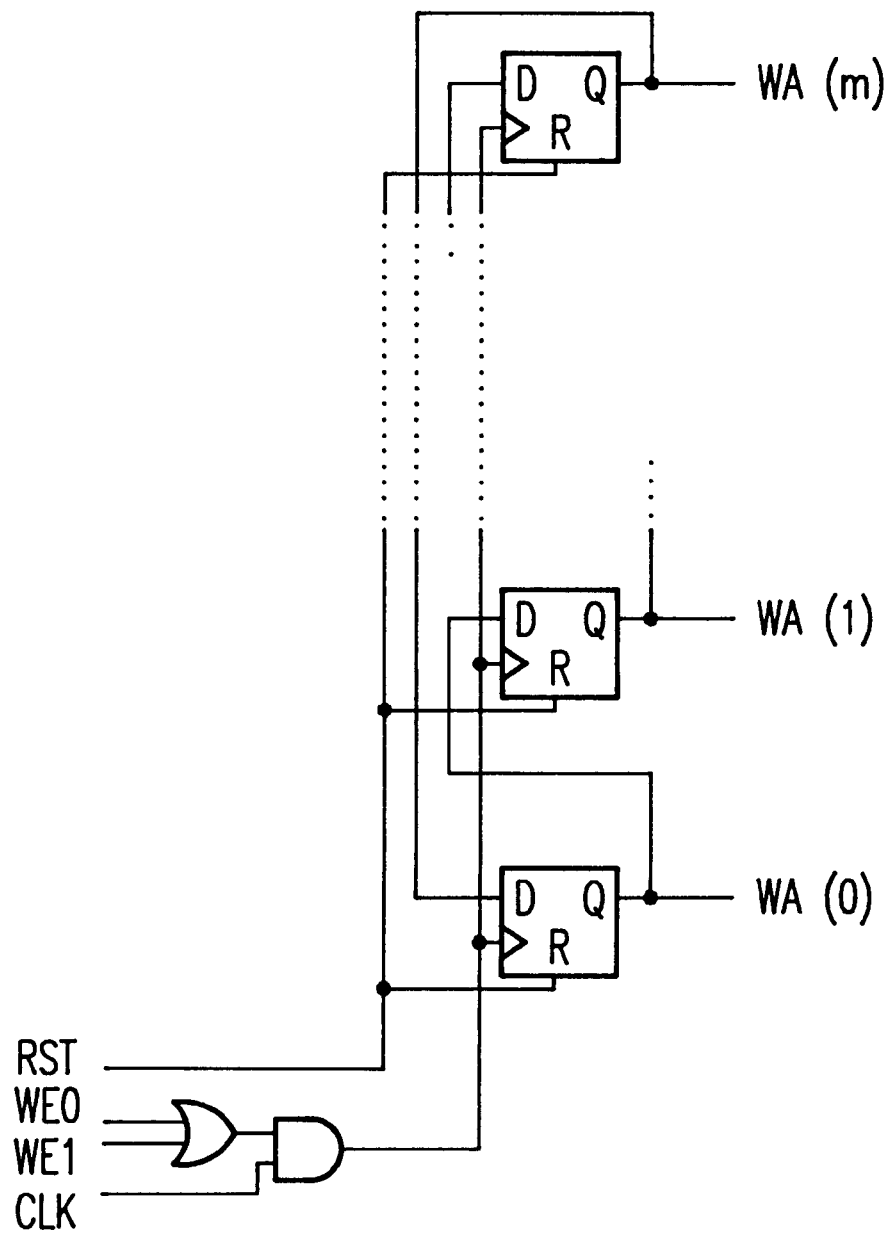
FIG. 4 is a structural view illustrating a write address generator of a FIFO memory with plural input ports of the first embodiment according to the present invention.
Figure 5:
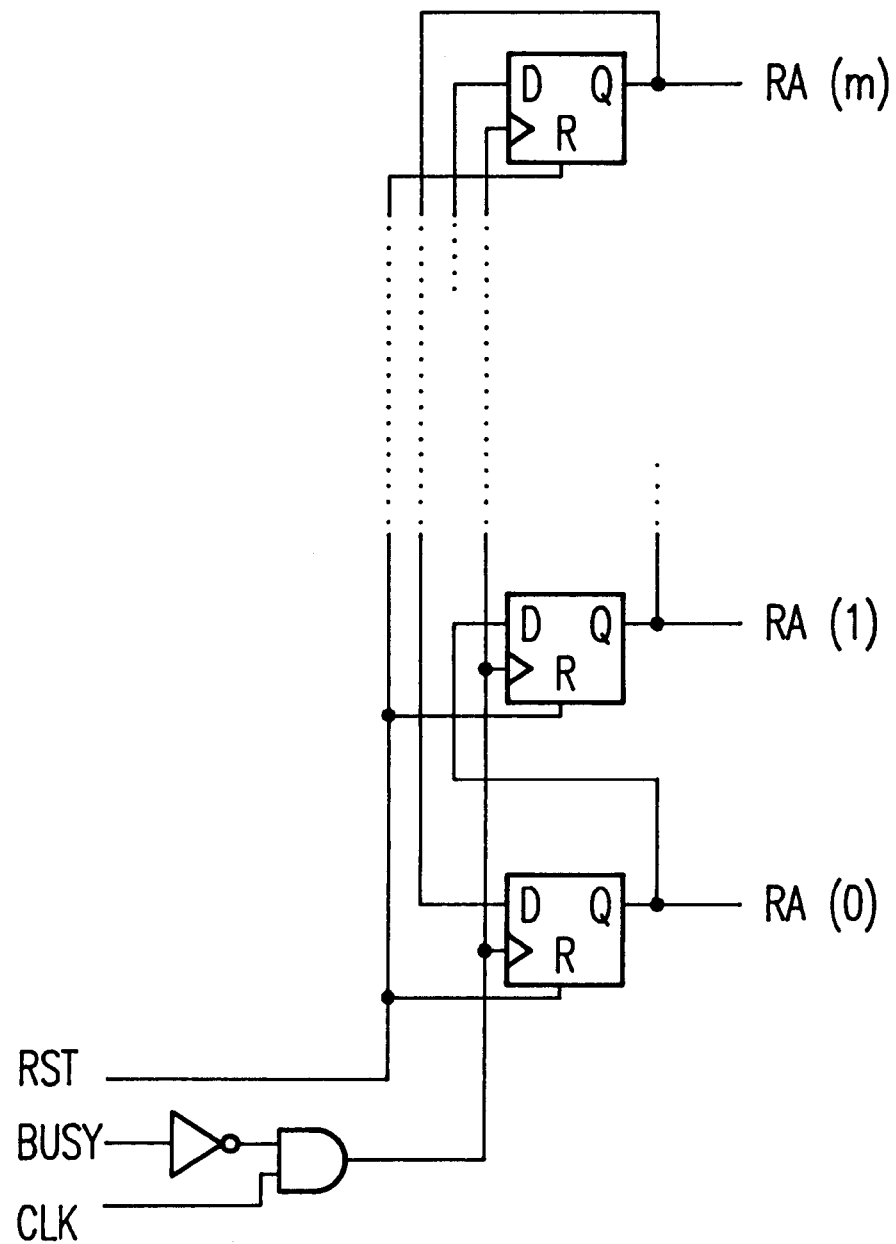
FIG. 5 is a structural view illustrating a read address generator of a FIFO memory with plural input ports of the first embodiment according to the present invention.
Figure 6:
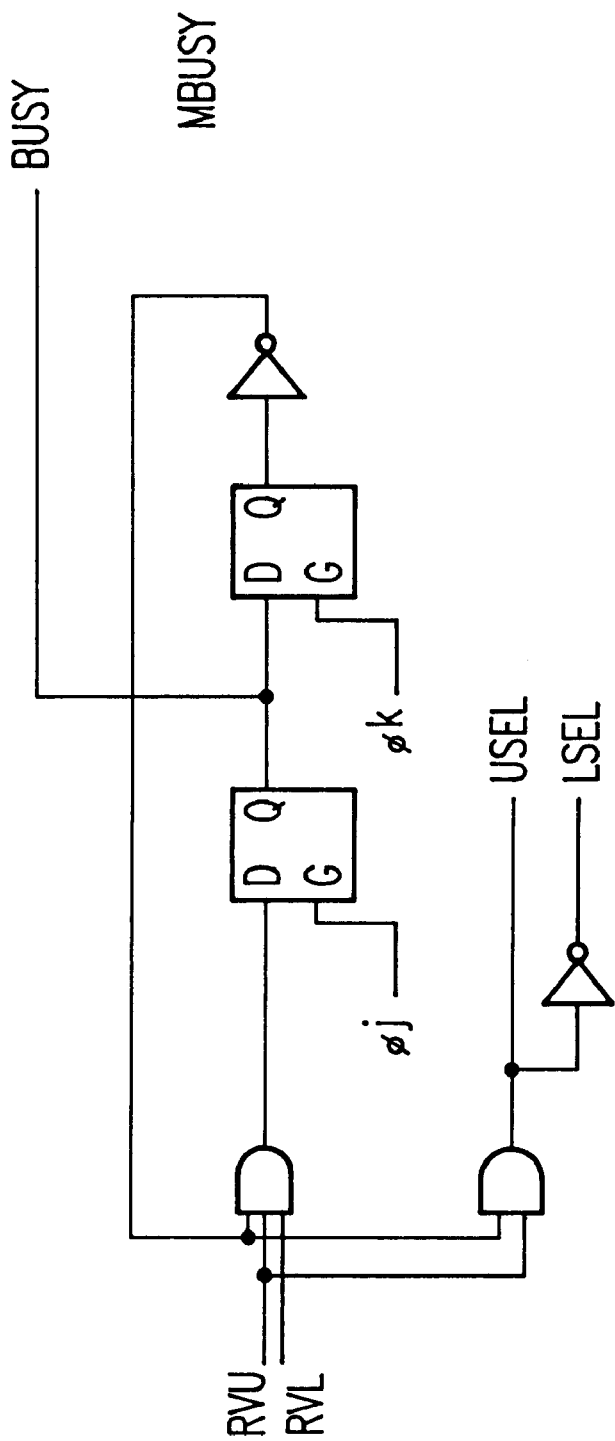
FIG. 6 is a structural view illustrating a read controller of a FIFO memory with plural input ports of the first embodiment according to the present invention.
Figure 8:
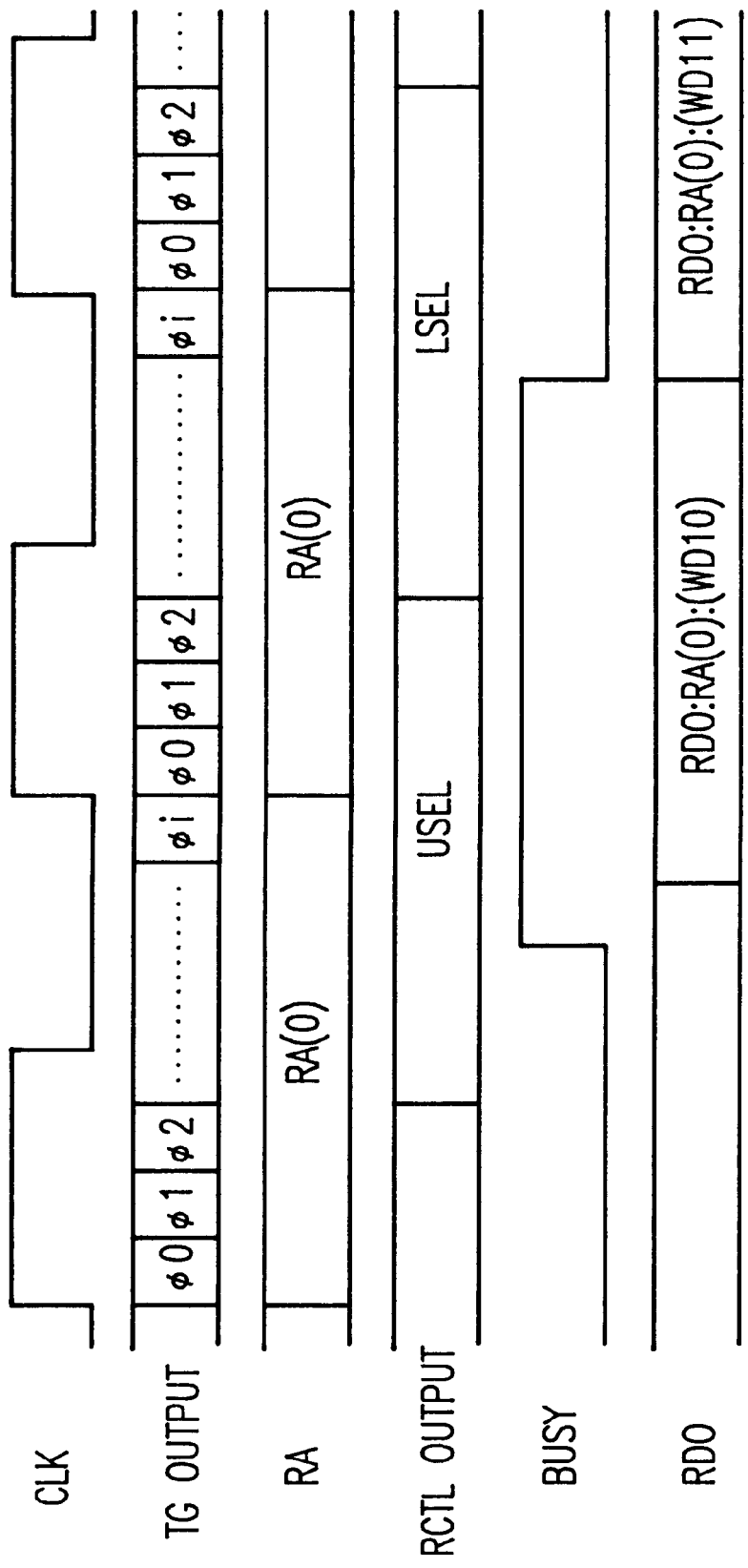
FIG. 8 is an explanatory view illustrating a read controller of a FIFO memory with plural input ports of the first embodiment according to the present invention.

FIG. 1 is a structural view illustrating a FIFO memory with plural input ports of the first embodiment according to the present invention. FIG. 2 is a structural view illustrating a memory core. FIG. 3 is a structural view illustrating a read side of a memory core. FIG. 4 is a structural view illustrating a write address generator. FIG. 5 is a structural view illustrating a read address generator. FIG. 6 is a structural view illustrating a read controller. FIG. 7 is a view illustrating truth values of the read controller. FIG. 8 is an explanatory view illustrating a read controller.

First, as shown in FIG. 1, a FIFO memory with plural input ports (FIFO semiconductor memory) is provided with input data signal multiplexers MUX1, MUX2, write request signal multiplexers MUX3, MUX4, a write address generator WAG, a memory core RAMCORE, a read address generator RAG, a timing generator TG, and a PLL circuit PLL.

The memory core RAMCORE, as shown in FIG. 2, consists of a validity register VB (1W1R cell, m-word×2-bit), a memory array MARRAY (1W1R cell, m-word×n-bit×2), write buffers WDBV, WDB0, WDB1, sense amplifiers SAV, SA0, SA1, a read controller RCTL, an output data latch OLA, a write address latch WAL, a read address latch RAL, a write timing control WTC, a read timing control RTC and a selector SEL, and constitutes a pseudo 2W1R multi-port memory of (m-words through 2m-words)×n-bit.

The write address generator WAG, as shown in FIG. 4, consists of a shift register in which an AND, an OR and DFFs generating enable signals are serially connected.

The read address generator RAG, as shown in FIG. 5, consists of a shift register in which an AND, an INV and DFFs generating enable signals are serially connected.

The read controller RCTL, as shown in FIG. 6, consists of ANDs, INVs and LATCHs.

Figure 9:
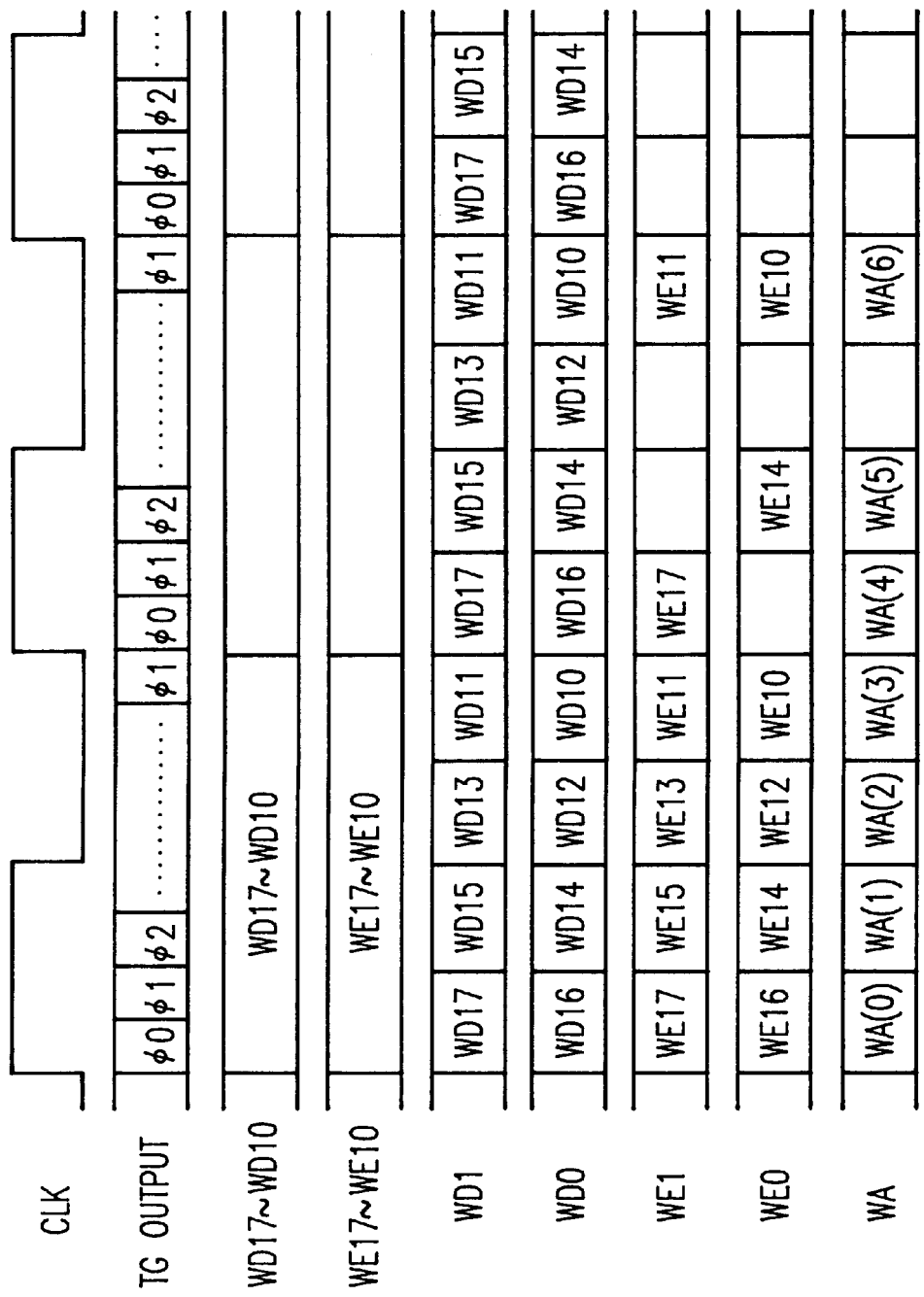
FIG. 9 is an explanatory view illustrating a write operation of a FIFO memory with plural input ports of the first embodiment according to the present invention.
Figure 10:
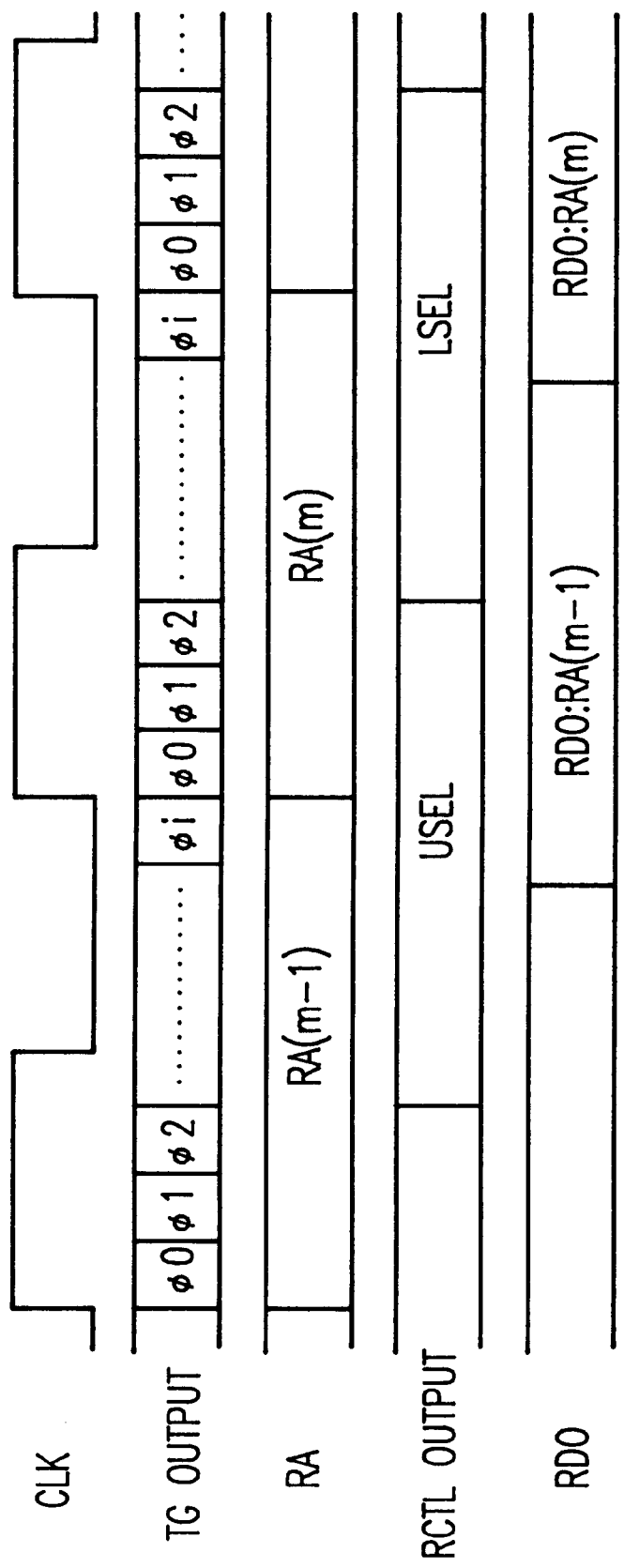
FIG. 10 is an explanatory view illustrating a read operation of a FIFO memory with plural input ports of the first embodiment according to the present invention.

Next, an explanation is given of the circuit operation of the first embodiment of the present invention shown in FIG. 1 with reference to FIGS. 9, 10.

The 8W1R multi-port memory of the present invention functions to write data of n-bit into each of ports not more than 8 simultaneously. The memory core RAMCORE uses the pseudo 2W1R multi-port memory of buffer capacity (m-2m), to which the validity register is added. 8W1R multi-port memory is carried out by four-multiplexing written data. The PLL circuit PLL generates a high-speed clock, thereby controlling internal timing.

Next, more detailed explanation are given of the operation.

First, in write operation, as shown in FIG. 9, n-bit input data signals WDI7, WDI5, WDI3, WDI1 are four-multiplexed by the MUX 1, n-bit input data signals WDI6, WDI4, WDI2, WDI0 are four-multiplexed by the MUX 2, write request signals WEI7, WEI5, WEI3, WEI1 are four-multiplexed by the MUX 3, and write request signals WEI6, WEI4, WEI2, WEI0 are four-multiplexed by the MUX 4. Four parallel signals of frequency f are time divisional multiplexed to one serial signal of frequency 4f.

The multiplexed n-bit input data signal WDI7, WDI5, WDI3, WDI1, the multiplexed n-bit input data signal WDI6, WDI4, WDI2, WDI0, the multiplexed write request signals WEI7, WEI5, WEI3, WEI1 and the multiplexed write request signals WEI6, WEI4, WEI2, WEI0 signal are respectively inputted into WD1, WD0, WE1, WE0 in the memory core RAMCORE which is the pseudo 2W1R multi-port memory. At the same time, the write request signals WEI7, WEI5, WEI3, WEI1 and the write request signals WEI6, WEI4, WEI2, WEI0 are inputted into the write address generator WAG.

Then, a write address is generated by the write address generator WAG and inputted into the WA of the memory core RAMCORE, whereby the n-bit input data signals WDI7, WDI5, WDI3, WDI1 and the n-bit input data signal WDI6, WDI4, WDI2, WDI0 are written. At that time, the address outputted from the write address generator WAG is always a sequential address unless no write request is given to both the internal ports 0, 1.

In the memory core RAMCORE shown in FIG. 2, by the write control clock WCLK outputted from the timing generator TG and the write timing control WTC, write data and addresses are outputted from the write buffers WDB0, WDB1 and from the write address latch WAL, respectively, and then are written into the 1W1R cell of the memory array MARRAY.

At the same time, the write request signal is written in the valid bit as valid bit from the write buffer WDBV. The memory array MARRAY is fabricated of 1W1R cell×2 instead of 2W1R cell, therefore, since data of the internal port having no write request is also read in addition to data of the internal port having a write request during data reading, the write request signal is used to judge data validity so that data of the internal port having no write request is not read as invalid data and data of the internal port having a write request is read as valid data.

Next, in the read operation, as shown in FIG. 10, the data written in the memory core RAMCORE as already explained is sequentially read in frequency f with the sequential address generated by the read address generator RAG composed of the shift register. At this time, data are read from the sense amplifiers SA0, SA1 (hereinafter, called LOWER channel as the internal port 1 and UPPER channel as internal port 0) by the validity bit read from the sense amplifier SAV (hereinafter, called RVL as read signal for write request signal WE0 and RVU as read signal for write request signal WE1), and validity of this data is judged, thereby reading data of the valid channel.

When both channels are valid simultaneously, as shown in FIG. 8, an address update stop signal BUSY is outputted and a pointer is held temporarily in the next cycle, thereby reading data of LOWER channel after that of UPPER channel.

These operations are carried out by the logical circuit shown in FIG. 6, which is fabricated based on the truth values shown in FIG. 7. USEL, LSEL indicate UPPER channel selection signal, LOWER channel selection signal, respectively.

The write operation timing and the read operation timing are controlled with the high-speed clock $\phi_i$ (i:integer) generated by forming a logic in timing generator TG based on the polyphase pulse outputted from the PLL circuit PLL. RST indicates a signal resetting address output of the write address generator WAG and the read address generator RAG.

Figure 14:
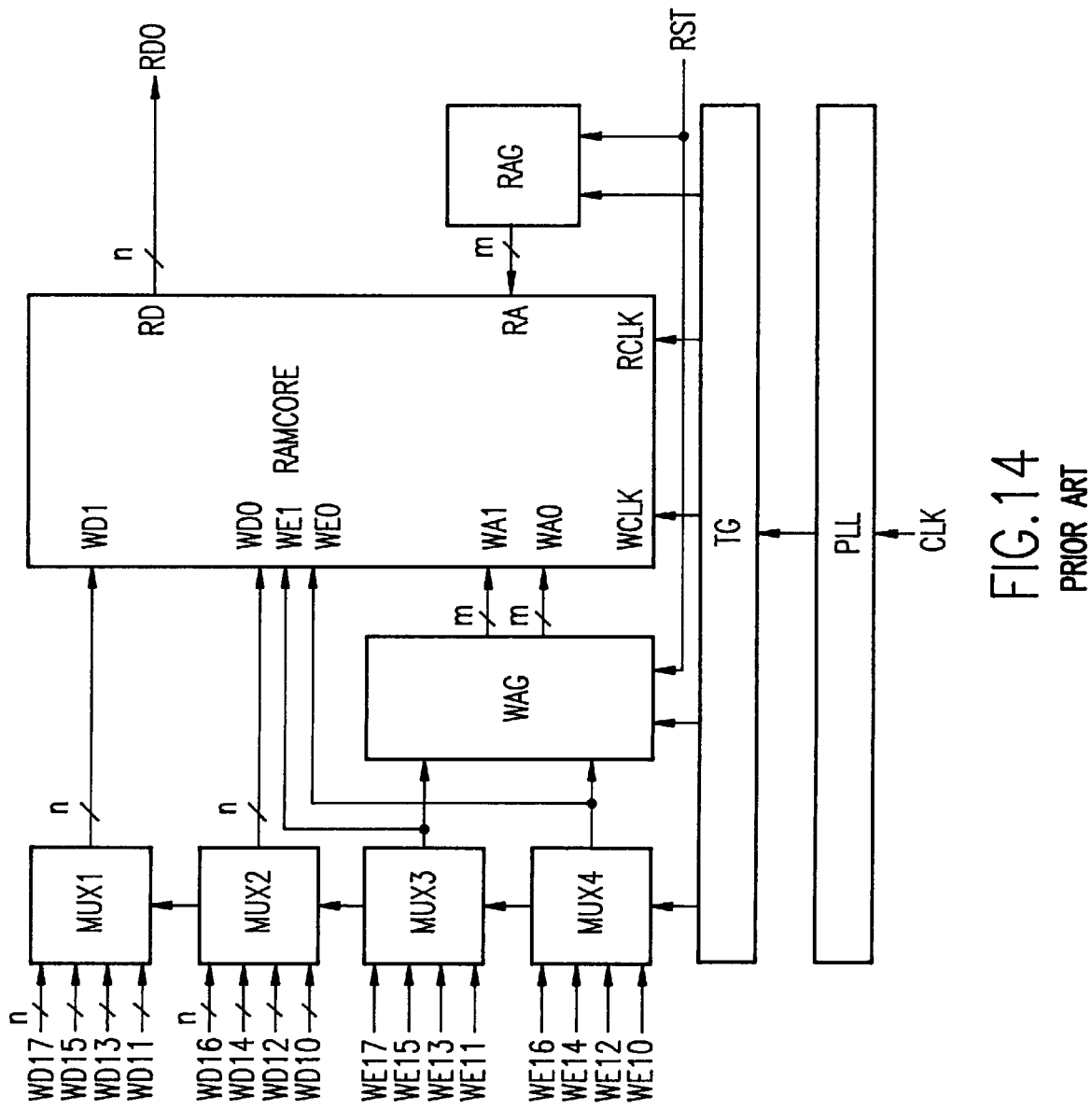
FIG. 14 is a structural view illustrating a conventional FIFO memory with plural input ports.
Figure 15:
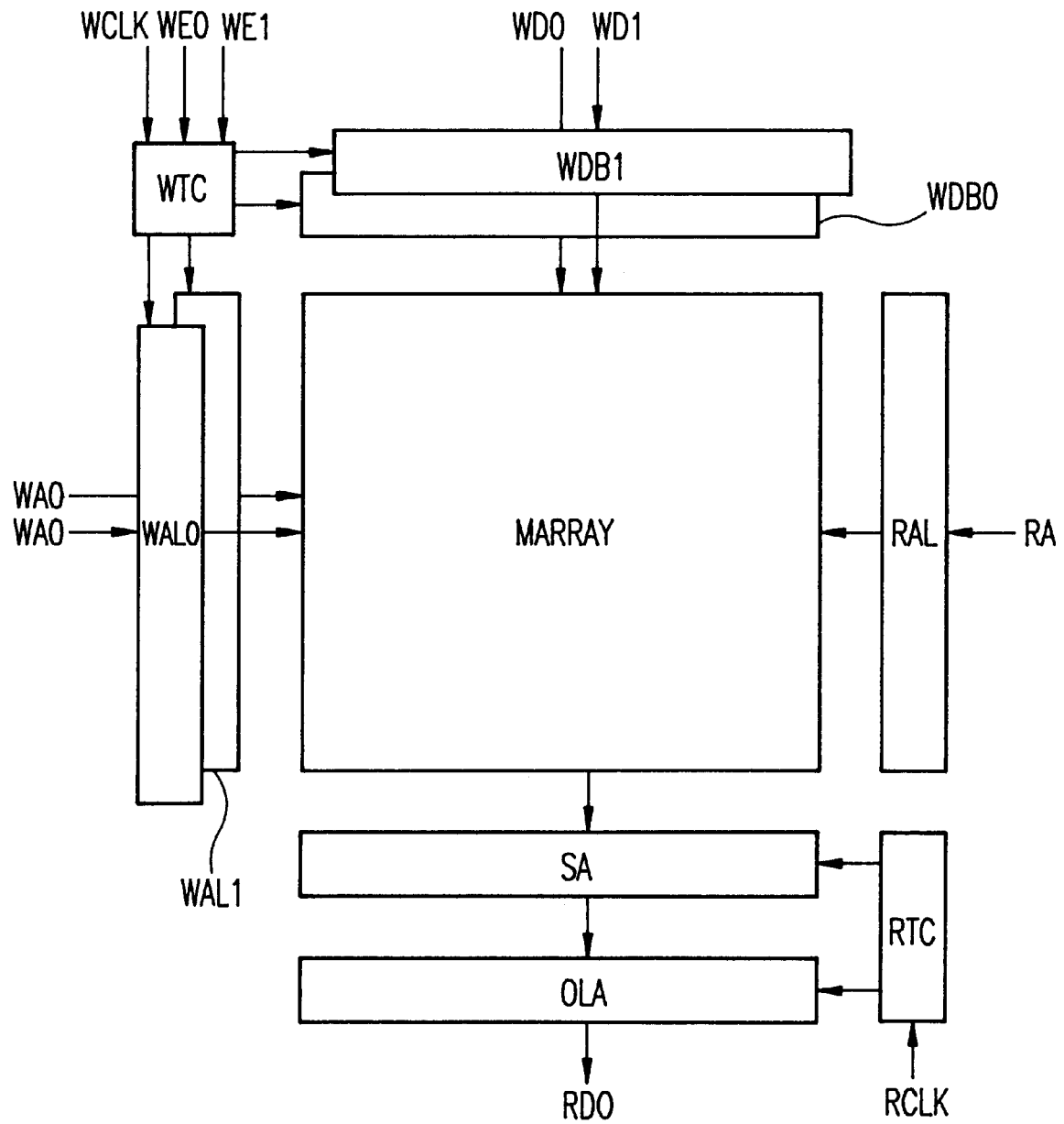
FIG. 15 is a structural view illustrating a memory core of a conventional FIFO memory with plural input ports.
Figure 16:
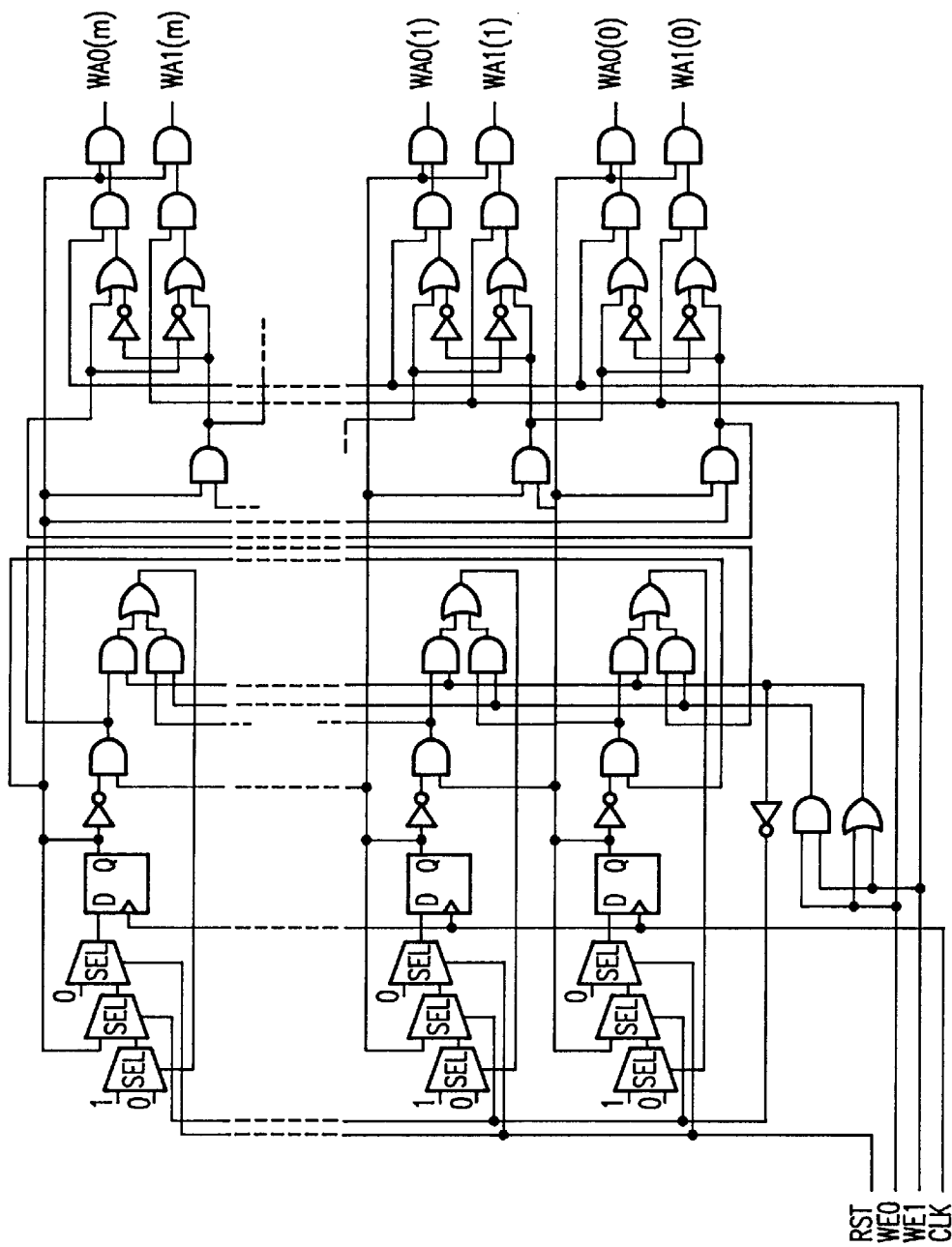
FIG. 16 is a structural view illustrating a write address generator of a conventional FIFO memory with plural input ports.
Figure 17:
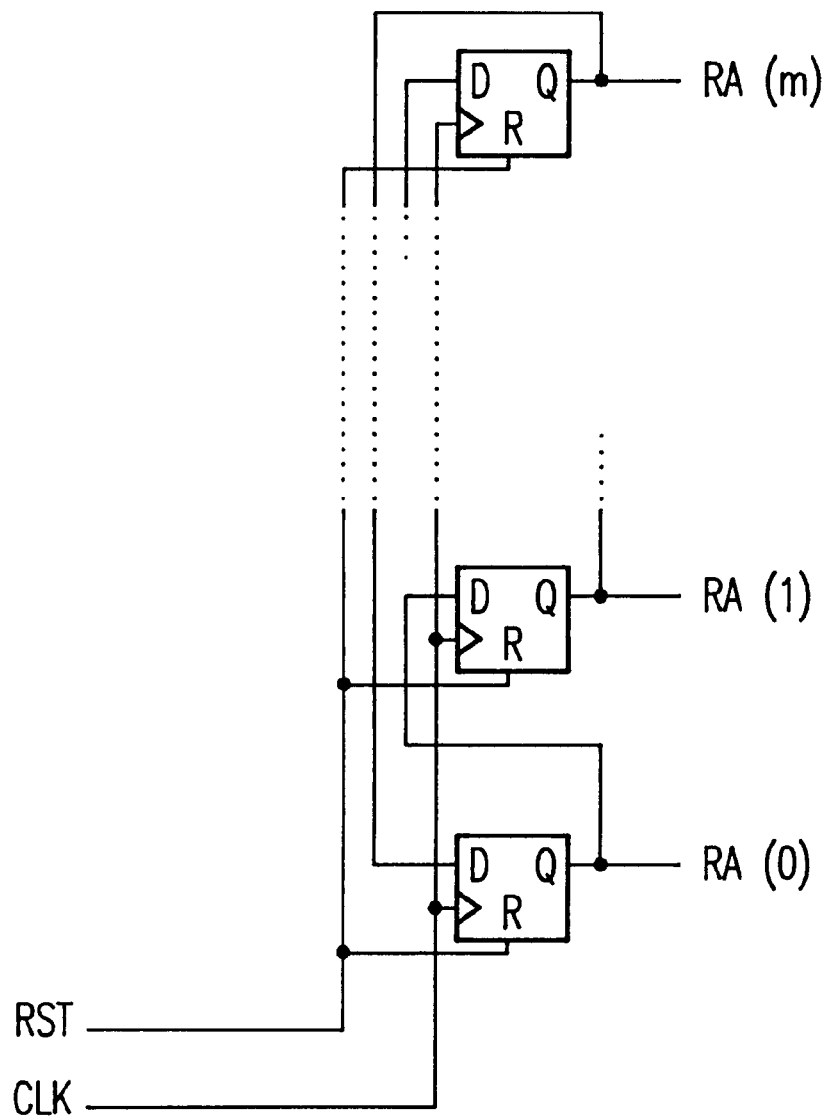
FIG. 17 is a structural view illustrating a read address generator of a conventional FIFO memory with plural input ports.
Figure 18:
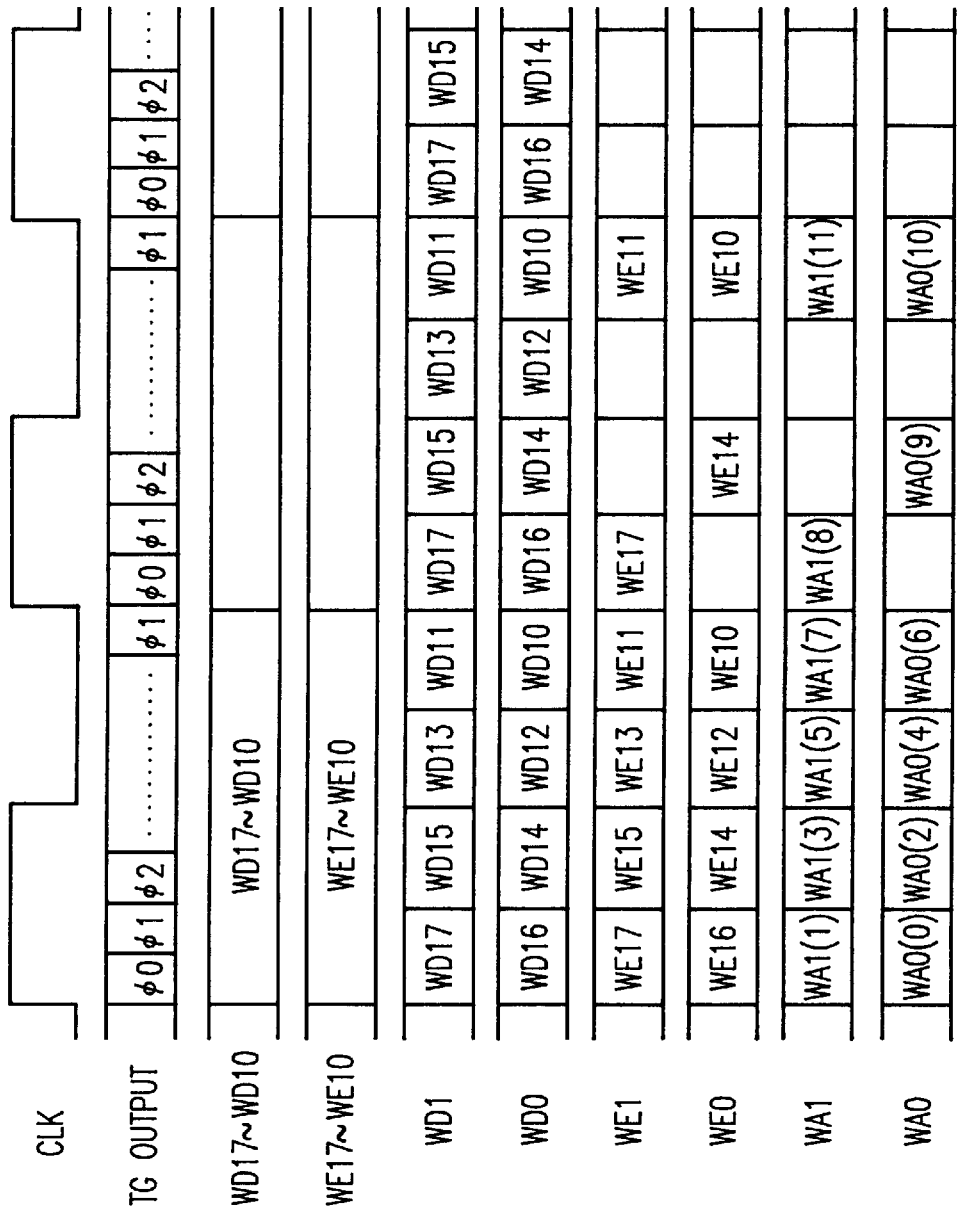
FIG. 18 is an explanatory view illustrating a write process of a conventional FIFO memory with plural input ports.
Figure 19:
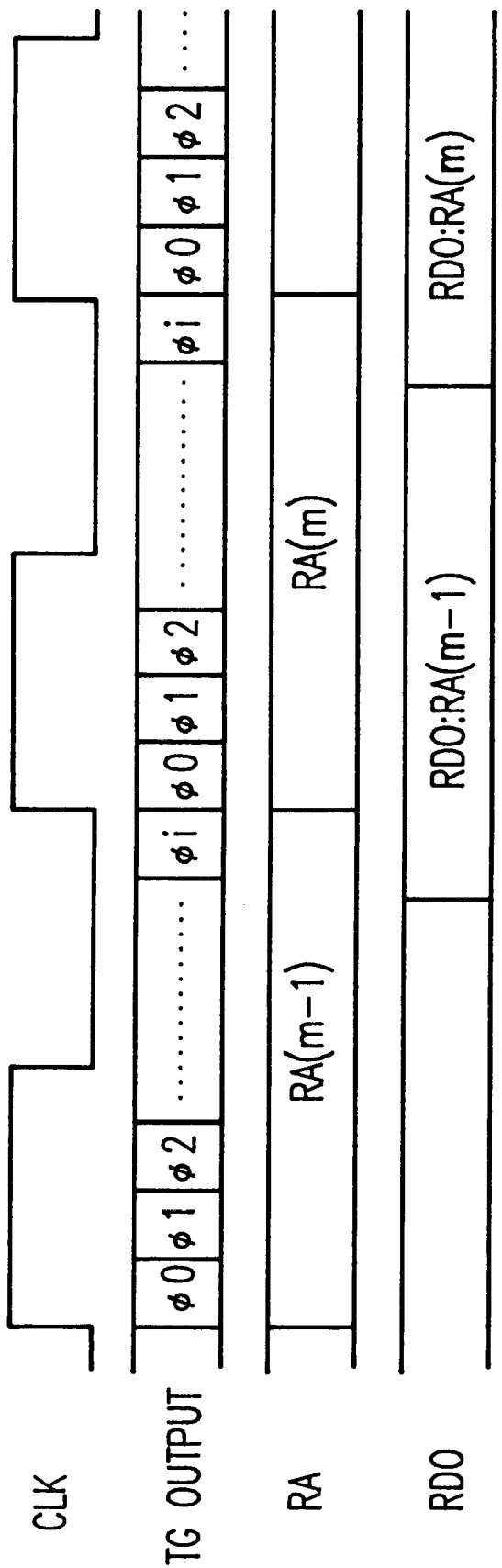
FIG. 19 is explanatory view illustrating a read process of a conventional FIFO memory with plural input ports.

In this way, according to the first embodiment, as shown in FIG. 1, the memory array MARRAY of m-word×n-bit×2 using 1W1R cell, the write address generator WAG composed of the shift register, the validity register of m-word× 2-bit using 1W1R cell, the write buffer WDBV, the sense amplifier SAV, the read control RCTL judging validity of read data, and the read address generator RAG with a circuit controlling update of the read address are connected, instead of the memory array MARRAY of m-word×n-bit using 2W1R cell, the write address generator WAG shifting address points in accordance with the number of write requests and the read address generator RAG in the conventional 8W1R multi-port memory as shown in FIG. 14. Thus, it is possible to simplify the write address control.

With this arrangement, in the write address generator WAG, it is possible to slice 4559 gates converted in SOG out by taking gate increment in the control circuit at read side into consideration.

Further, as to layout area, in the write address generator WAG, it is possible to slice about 77.4% out. In the memory array, since 2W1R cell is about 2.4 times the size of 1W1R cell according to the second generation 0.5 μm logic design standard, there is no layout area loss in the first embodiment. For example, when the bit number n of input data is set to 54 and the word number m is set to 128, the layout area including 1W1R cell is that the about 14% of layout area including 2W1R cell is sliced out.

Next, an explanation is given of the second embodiment according to the present invention.

Figure 11:
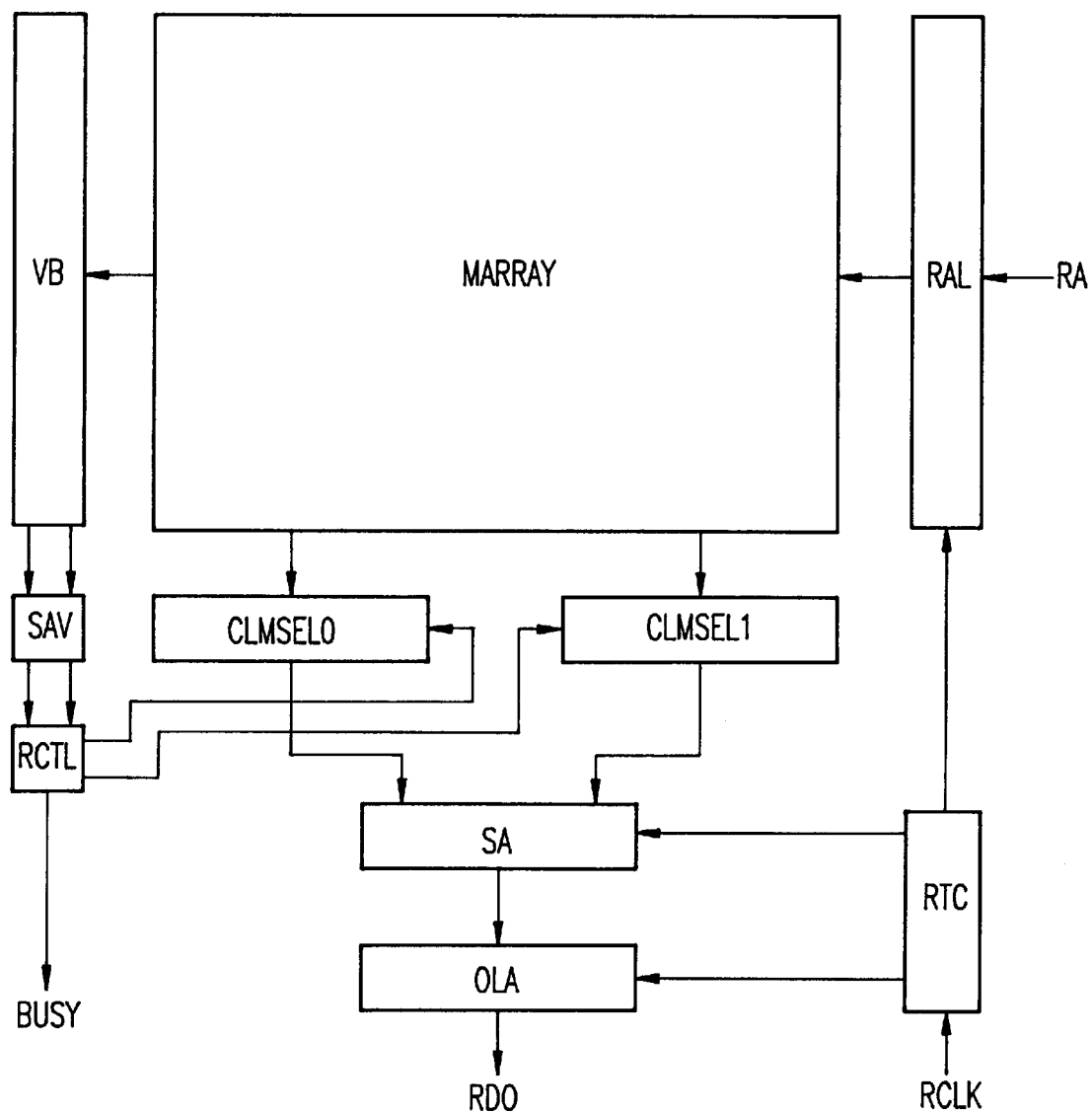
FIG. 11 is a structural view illustrating a memory core of a FIFO memory of the second embodiment according to the present invention.

FIG. 11 is a structural view showing a memory core of a FIFO memory of the second embodiment according to the present invention. In the second embodiment, column selectors CLMSEL0, CLMSEL1, and a sense amplifier SA are connected, instead of the sense amplifiers SA0, SA1 and the selector SEL in the read side structure of the memory core according to the first embodiment shown in FIG. 3.

Figure 12:
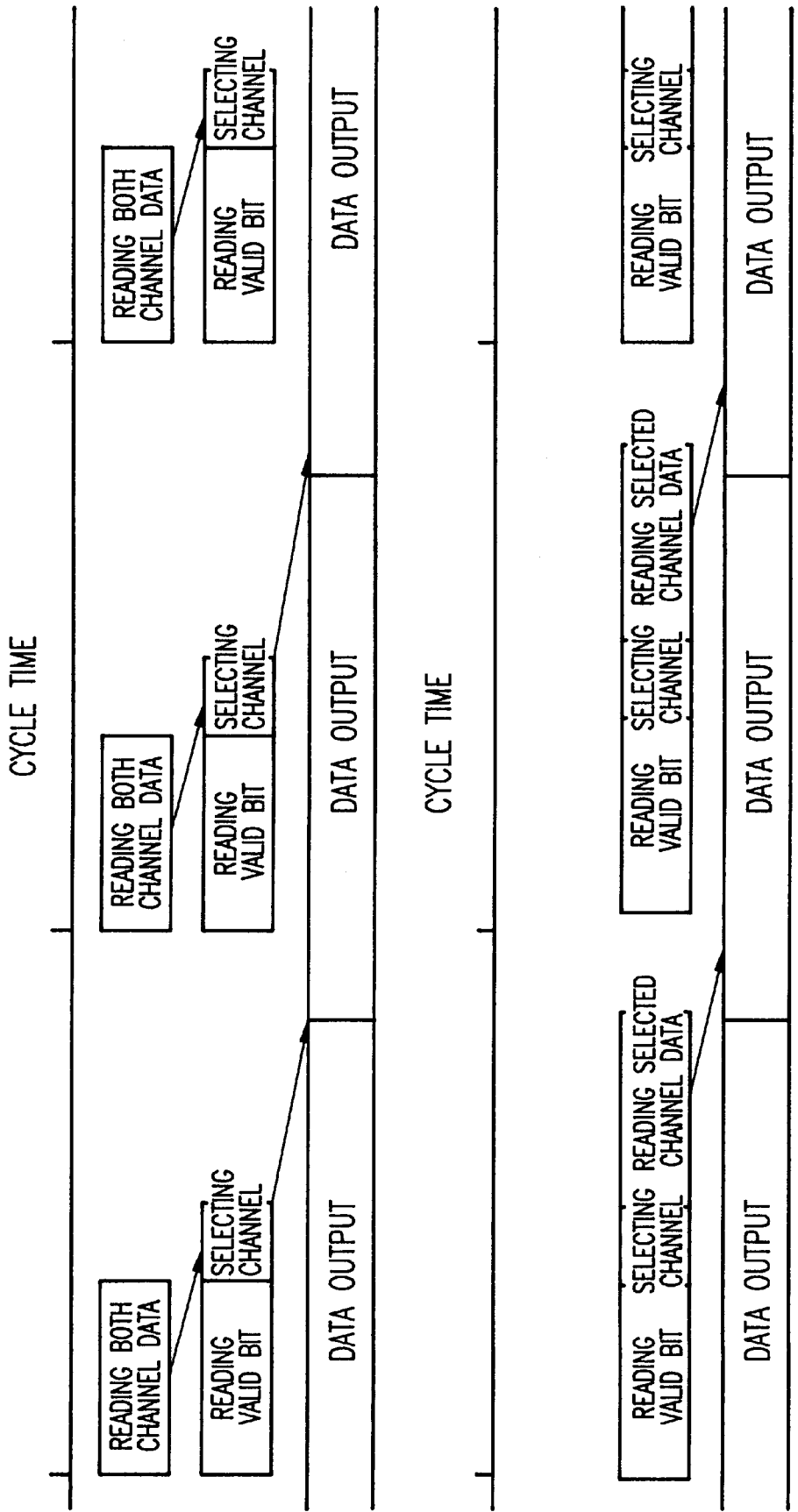
FIG. 12 is an explanatory view illustrating a circuit operation of a FIFO memory of the second embodiment according to the present invention.

Explanations are given of the circuit operation of the second embodiment with reference to FIG. 12 in addition to FIG. 11.

In the first embodiment, the selector selects a channel after reading both channel data and validity bit, however, in the second embodiment, as shown in FIG. 12, first, the validity bit is read, and then column selectors CLMSEL0, CLMSEL1 select channels and the sense amplifier SA reads data from selected channel.

With this arrangement, since channel data is read by only sense amplifier SA of selected channel instead of the sense amplifiers SA0, SA1, the power consumption for sense amplifier can be reduced to ½.

As above described, in the second embodiment, the column selectors CLMSEL0, CLMSEL1 and the sense amplifier SA are connected, instead of the sense amplifiers SA0, SA1 and the selector SEL in the read side structure of the memory core in the first embodiment of the present invention shown in FIG. 3. Thus, the power consumption for sense amplifiers can be reduced to ½.

Next, an explanation is given of the third embodiment according to the present invention.

Figure 13:
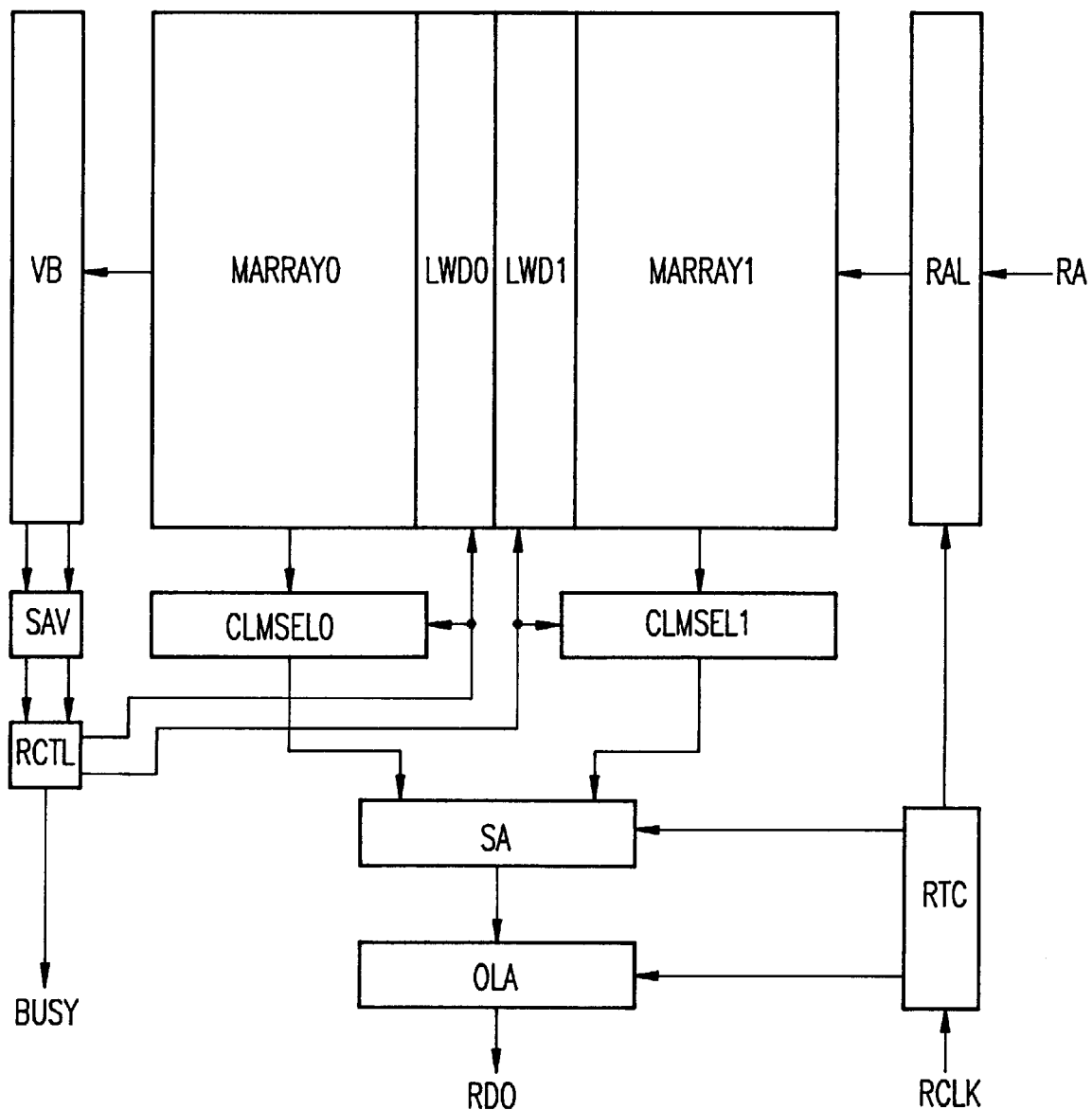
FIG. 13 is a structural view illustrating a memory core of a FIFO memory of the third embodiment according to the present invention.

FIG. 13 is a structural view showing a memory core of a FIFO memory of the third embodiment according to the present invention.

Compared with the second embodiment shown in FIG. 11, this circuit is that the memory array MARRAY is divided into two, and local word drivers LWD0, LWD1 are respectively provided in the memory arrays MARRAY0, MARRAY1 and receives channel selection signals.

In the third embodiment, since channel selection signals are respectively inputted into the local word drivers LWD0, LWD1, the memory array of non-selected channel is not activated, thereby reducing the power consumption in the memory array to ½ compared with the second embodiment.

As above described, in the third embodiment, the memory array MARRAY of the second embodiment is divided into two, and local word drivers LWD0, LWD1 are respectively provided in the memory arrays MARRAY0, MARRAY1 and receives channel selection signals. Thus, the power consumption in the memory array can be reduced to ½.

The present invention is not limited to the above embodiments, and can be varied not to be regarded as departure from the spirit and scope of the invention. Such variations should not be excluded from the scope of the present invention.

According to the present invention, the following technical effects can be achieved.

(1) A write address generator performing complicated control by using many gates are improved, and a semiconductor memory is provided with a memory cell array capable of reducing layout area, a write address generator sequentially generating addresses to be written in the memory array, a validity register, a buffer writing into the validity register in accordance with write request, a read address generator generating read addresses from the memory cell array and a control part judging validity of data read from the memory cell array in accordance with a signal read from the validity register. Thus, it is possible to improve the write address generator performing complicated control by using many gates and to reduce layout area.

(2) A memory array of m-word×n-bit(N)×2 using 1W1R cell, a write address generator composed of the shift register, a validity data of m-word×2 bit using 1W1R cell, a write buffer for the valid bit, a sense amplifier for the validity data, a read control judging validity of read data and a read address generator with a circuit controlling update of the read address are connected, instead of the memory array of m-word×n-bit using 2W1R cell, the write address generator shifting address points in accordance with the number of write requests and the read address generator in the conventional multi-port FIFO memory. Thus, it is possible to simplify control of the write address and to slice about 77.4% of layout area in the write address generator out.

(3) Instead of the sense amplifier for reading each channel data and the selector for channel selection, a column selector for each memory array and a sense amplifier for reading selected channel data are connected, and the validity bit and selected channel data are read by time sharing. Thus, it is possible to reduce power consumption of the sense amplifier to ½.

(4) A memory array is divided into two, and a local word driver is provided in each memory array and is connected to the channel selection signal. Thus, it is possible to reduce the power consumption in the memory array to ½, compared with the above structure of (3).

What is claimed is:

1. A semiconductor memory comprising:
    a memory cell array;
    a write address generator generating sequential addresses to be written in the memory cell array;
    a validity register;
    a write buffer writing a validity bit into the validity register;
    a read address generator generating a read address for the memory cell array; and
    a read controller judging validity of read data from the memory cell array in accordance with the validity bit read from the validity register.

2. A semiconductor memory according to the claim 1, wherein said semiconductor memory is a FIFO (First-In First-Out) semiconductor memory having plural input ports,
    wherein said memory cell array is m-word×n-bit×2 with a 1W1R cell,
    wherein said validity register is m-word×2-bit, and
    wherein said write address generator includes a shift register.

3. A semiconductor memory according to the claim 2, further comprising:
    a first column selector for selecting first channels from a first m-word×n-bit portion of the memory cell array;
    a second column selector for selecting second channels from a second m-word×n-bit portion of the memory cell array; and
    a sense amplifier connected to the first and second column selectors for reading selected channel data by time-sharing.

4. A semiconductor memory according to the claim 3, wherein, further comprising:
    a first local word driver provided for the first portion of the memory cell arrays; and a second local word driver provided for the second portion of the memory cell array, wherein the first and second local word drivers each receive a channel selection signal from said read controller.

5. A FIFO (First-In First-Out) semiconductor memory, comprising:

a memory cell array;

a write address generator generating sequential addresses to be written in the memory cell array;

a validity register with a 1W1R cell;

a write buffer for writing a validity bit into the validity register;

a read controller judging the validity of read data from the memory cell array; and a read address generator, including a circuit for controlling updating of a read address for the memory cell.

6. The FIFO semiconductor memory of claim 5, wherein said memory cell array is m-word×n-bit×2 with a 1W1R cell, and wherein said validity register is m-word×2-bit.

7. The FIFO semiconductor memory of claim 6, further comprising:

a first sense amplifier for reading first column data from a first m-word×n-bit portion of the memory cell array;

a second sense amplifier for reading second column data from a second m-word×n-bit portion of the memory cell array; and a selector connected to the first and second sense amplifiers for selecting read data corresponding to said validity judgment of said read controller according to a validity bit read from said validity register.

8. The FIFO semiconductor memory of claim 6, further comprising:

a first column selector for selecting first channels from a first m-word×n-bit portion of the memory cell array;

a second column selector for selecting second channels from a second m-word×n-bit portion of the memory cell array; and a sense amplifier connected to the first and second column selectors for reading selected channel data by time-sharing.

9. The FIFO semiconductor memory of claim 8, further comprising:

a first local word driver provided for the first portion of the memory cell array; and a second local word driver provided for the second portion of the memory cell array, wherein the first and second local word drivers each receive a channel selection signal from said read controller.

10. The FIFO semiconductor memory of claim 6, wherein the FIFO has plural input ports and further comprises:

a first data signal multiplexer receiving a first plurality of data signals from said plural input ports and generating therefrom a first multiplexed data signal;

a second data signal multiplexer receiving a second plurality of data signals from said plural input ports and generating therefrom a second multiplexed data signal;

a first write request signal multiplexer receiving a first plurality of write request signals from said plural input ports and generating therefrom a first multiplexed write request signal, and providing said first multiplexed write request signal to said write address generator and to said write buffer;

a second write request signal multiplexer receiving a second plurality of write request signals from said plural input ports and generating therefrom a second multiplexed write request signal, and providing said second multiplexed write request signal to said write address generator and to said write buffer;

a second write buffer receiving said first multiplexed data signal; and a third write buffer receiving said second multiplexed data signal, said second and third write buffers producing write data for said memory cell array.

* * * * *